(12) United States Patent
Asayag et al.

(10) Patent No.: US 10,942,761 B2
(45) Date of Patent: *Mar. 9, 2021

(54) MIGRATING A VIRTUAL MACHINE IN RESPONSE TO IDENTIFYING AN UNSUPPORTED VIRTUAL HARDWARE COMPONENT

(71) Applicant: Red Hat Israel, Ltd., Raanana (IL)

(72) Inventors: Mordechay Asayag, Netanya (IL); Michael Kolesnik, Netanya (IL)

(73) Assignee: Red Hat Israel, Ltd., Raanana (IL)

( * ) Notice: Subject to any disclaimer, the term of this patent is extended or adjusted under 35 U.S.C. 154(b) by 43 days.

This patent is subject to a terminal disclaimer.

(21) Appl. No.: 16/363,885

(22) Filed: Mar. 25, 2019

(65) Prior Publication Data
US 2019/0220303 A1 Jul. 18, 2019

Related U.S. Application Data

(63) Continuation of application No. 15/609,402, filed on May 31, 2017, now Pat. No. 10,241,823.

(51) Int. Cl.
*G06F 9/455* (2018.01)

(52) U.S. Cl.
CPC .. *G06F 9/45558* (2013.01); *G06F 2009/4557* (2013.01); *G06F 2009/45595* (2013.01)

(58) Field of Classification Search
CPC .................................................. G06F 9/45558
See application file for complete search history.

(56) References Cited

U.S. PATENT DOCUMENTS

| | | |
|---|---|---|
| 7,581,229 B2 | 8/2009 | Watkins et al. |
| 8,635,395 B2 | 1/2014 | Colbert |
| 9,158,571 B2 | 10/2015 | Rosato et al. |
| 9,213,840 B2 | 12/2015 | Mooring et al. |
| 9,311,119 B2 | 4/2016 | Shah |
| 9,424,062 B1 | 8/2016 | Mummidi et al. |
| 2011/0134793 A1 | 6/2011 | Elsen et al. |
| 2013/0091500 A1* | 4/2013 | Earl ............... G06F 9/4555 718/1 |

(Continued)

OTHER PUBLICATIONS

VM Ware, Migrating a Virtual Machine Configured with Virtual Hardware version 718 to an ESXi Host with Newer CPU Generation Fails with Error: The Virtual Machine Requires Hardware Features that are Unsupported or Disabled on the Target Host (2109065), Updated Jan. 2, 2017, 1 page.

(Continued)

*Primary Examiner* — Charlie Sun
(74) *Attorney, Agent, or Firm* — Lowenstein Sandler LLP

(57) ABSTRACT

A request to provide a virtual machine with a virtual hardware component may be received. A network that the virtual hardware component is configured to operate on may be identified. A determination may be made as to whether a hypervisor supports or does not support the network that the virtual hardware component is configured to operate on. In response to determining that the hypervisor does not support the network that the virtual hardware component is configured to operate on, the virtual machine with the virtual hardware component may be provided to a second hypervisor that supports the network.

20 Claims, 6 Drawing Sheets

(56) References Cited

U.S. PATENT DOCUMENTS

2015/0378760 A1   12/2015   Su et al.
2016/0378534 A1   12/2016   Oh et al.

OTHER PUBLICATIONS

William Lam, How to Enable Nested ESXi & Other Hypervisors in vSphere 5.1, virtuallyGhetto, Aug. 29, 2012, 34 pages. http://www.virtuallyghetto.com/2012/08/how-to-enable-nested-esxi-other.html.
Kerio Help Systems, Installing Kerio Control, Copyright GFI Software Development Ltd, 2017, downloaded Mar. 27, 2017, 4 pages. http://kb.kerio.com/product/keriocontrol/installationkeriocontrol/installingkeriocontrol1219.html.
VM Ware, Migrating a Virtual Machine Configured with Virtual Hardware version 7/8 to an ESXi Host with Newer CPU Generation Fails with Error: The Virtual Machine Requires Hardware Features that are Unsupported or Disabled on the Target Host (2109065), Updated Jan. 2, 2017, 1 page.

\* cited by examiner

MIGRATING A VIRTUAL MACHINE IN RESPONSE TO IDENTIFYING AN UNSUPPORTED VIRTUAL HARDWARE COMPONENT

RELATED APPLICATION

This application is a continuation of U.S. patent application Ser. No. 15/609,402 filed on May 31, 2017, which is incorporated by reference herein.

TECHNICAL FIELD

The present disclosure is generally related to virtualization, and is more specifically related to migrating a virtual machine in response to identifying an unsupported virtual hardware component.

BACKGROUND

Network virtualization may be software-emulated representations of physical network components of physical network infrastructure used to provide corresponding virtual network components to a host computer system. The host computer system may execute a host operating system (OS) to run an application container. A host computer system may also execute a hypervisor to run one or more virtual machines (VM). The host computer system may be used for network virtualization. The host computer system may include both physical and virtual network components to be used for network virtualization. Physical network components may include networking hardware such as routers, bridges, switches, and network interface cards (NICs) used to facilitate the transmission of data in a computer network. Virtual network components may be software-emulated representations of corresponding physical network components.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
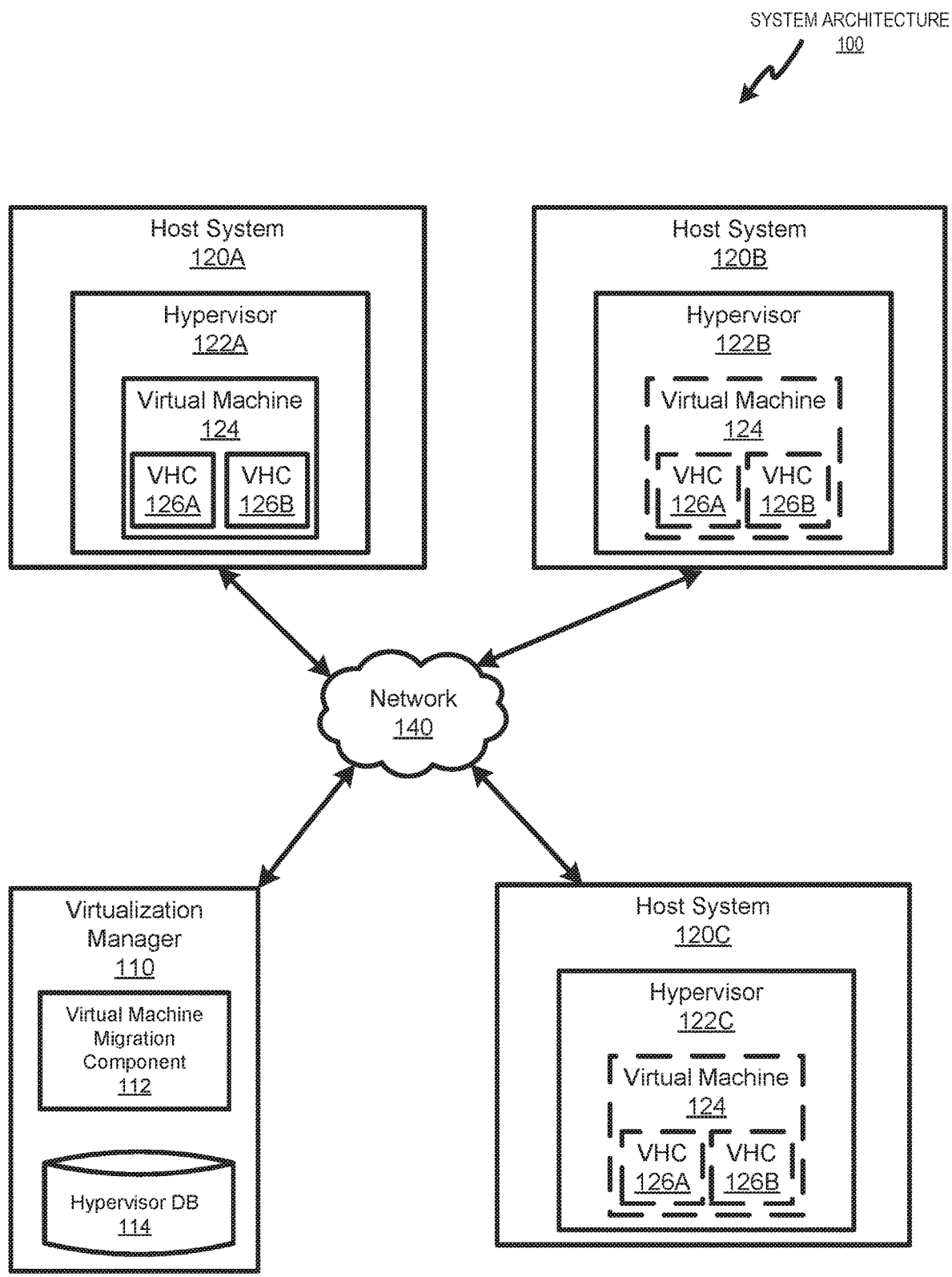
FIG. 1 depicts a high-level diagram of an example system architecture operating in accordance with one or more aspects of the present disclosure.

Aspects of the present disclosure relate to migrating a virtual machine in response to identifying an unsupported virtual hardware component. Data centers may include host systems that are communicatively coupled to one or more networks within the data center. For example, a data center may include multiple networks (e.g., network A, network B, network C). A hypervisor executed by a host system may be configured to operate over particular networks within the data center. For example, the hypervisor may be configured for networks A and B, but may not be configured to operate on network C.

A VM running on the hypervisor may include virtual hardware components (VHCs) that are configured to operate over particular networks (e.g., to receive and transmit data over the particular networks). For example, a VHC may be configured to operate over network A. If a user desires to install a new VHC on the VM, a request to install the new VHC is sent to a virtualization manager. The virtualization manager may identify the networks that the new VHC is configured to operate on and may determine whether the hypervisor that is currently executing the VM is also configured to operate on those networks. If the hypervisor is not configured to operate over the networks required by the new VHC, then the virtualization manager may prevent the user from installing the new VHC on the VM. For example, if the new VHC is configured to operate on network C while the hypervisor is configured to operate over networks A and B, then the user may not be able to install the new VHC on the VM. This requires the user to either continue using the VM without the new VHC or to initialize a new VM on a different hypervisor that is configured for the networks needed by the new VHC. Such a process may be cumbersome and time-consuming.

Accordingly, described herein are aspects to migrate a VM in response to identifying a virtual hardware component that is to be added to the VM and that operates on a network that is not configured for a hypervisor that currently provides the VM. In an example, the virtualization manager may receive a request in install a new VHC on a virtual machine that is executed by a hypervisor. Subsequently, the virtualization manager may identify a network that the new VHC is configured to operate on. The virtualization manager may determine that the hypervisor does not support the network that the new VHC is configured to operate on. The virtualization manager may identify another hypervisor that supports the network. In response to identifying the other hypervisor that supports the network, the virtualization manager may migrate the VM from the original hypervisor to the other hypervisor to allow the new VHC to be installed (e.g., hot plugged) on the running VM.

According to aspects of the disclosure, the virtualization manager may identify multiple hypervisors that are configured for the network that the new VHC is configured to operate on. In such an example, the virtualization manager may determine which of the hypervisors to migrate the VM to in view of a migration policy. The virtualization monitor may also determine which of the hypervisors to migrate the VM to in view of available computing resources and the ability to support existing VHCs of the VM.

Thus, the aspects of the present disclosure may be advantageous as the process of installing new VHCs on a running VM may be simplified. For example, the amount of time required to install new VHCs may be reduced as a VM may be migrated to a hypervisor that supports a network needed by a VHC that is to be added to the VM. In addition, the virtualization manager may migrate a running VM to a particular hypervisor according to one or more migration policies, allowing for more efficient use of computing resources of the data center.

FIG. 1 illustrates an example system architecture 100 in which implementations of the disclosure may operate. The system architecture 100 may include a virtualization manager 110 and multiple host systems 120A, 120B and 120C coupled via a network 140. The network 140 may be a public network (e.g., the Internet), a private network (e.g., a local area network (LAN) or wide area network (WAN)), or a combination thereof. Network 140 may include a wireless infrastructure, which may be provided by one or more wireless communications systems, such as a wireless fidelity (WiFi) hotspot connected with the network 140 and/or a wireless carrier system that can be implemented using various data processing equipment, communication towers, etc. Additionally or alternatively, network 140 may include a wired infrastructure (e.g., Ethernet).

Each of the host systems 120A, 120B and 120C may include one or more processors communicatively coupled to memory devices and input/output (I/O) devices. Each of the host systems 120A, 120B and 120C may run a virtual machine 124 by executing hypervisors 122A, 122B and 122C, respectively, to abstract the physical layer, including processors, memory, and I/O devices, and present this abstraction to the virtual machine 124 as virtual devices. The virtual machine 124 may execute a guest operating system that may utilize the underlying virtual devices, including virtual processors, virtual memory, and virtual I/O devices. One or more applications may be running on a virtual machine under the guest operating system. The virtual machine 124 may have VHCs 126A and 126B installed. For example, VHCs 126A and/or 126B may be a virtual network interface component that may be used by VM 124 to receive and transmit network traffic over the network 140. In one implementation, VHC 126A may be an existing VHC that has been previously installed on virtual machine 124 and VHC 126B may be a new VHC that a user wishes to install on virtual machine 124. The hypervisors 122A, 122B and 122C may create, run, manage, and monitor various aspects of the virtual machine 124 operation, including the processing, and storage, memory, and network interfaces. In an illustrative example, hypervisors 122A, 122B and 122C may be provided by a Virtual Desktop and Server Management (VDSM) daemon (not shown). The VDSM daemon may include an application programming interface (API) with which the virtualization manager 110 interfaces.

The VDSM of each host system 120A, 120B and 120C may provide requests to install virtual hardware components to the virtualization manager. For example, the request may be transmitted by the VDSM in response to a user attempting to install a new virtual hardware component on virtual machine 124. The request may include requirements of the virtual hardware component, such as networks the virtual hardware component is configured to operate on and the computing resources required to operate the virtual hardware component.

In certain implementations, host systems 120A, 120B and 120C may be grouped into one or more logical groups that may be also referred to as a "data center." A data center may represent the highest level of abstraction in a virtualization model. Each data center may be communicatively coupled, via the network 140, to one or more storage domains storing disk images for machines, such as virtual machine 124.

The virtualization manager 110 may be hosted by a computer system (described in more detail below with reference to FIG. 6) and include one or more computer programs executed by the computer system for centralized management of the system architecture 100. In one implementation, the virtualization manager 110 may include various interfaces, including administrative interface, reporting interface, and/or application programming interface (API) to communicate with host systems 120A, 120B and 120C of system architecture 100, as well as to user portals, directory servers, and various other components, which are omitted from FIG. 1 for clarity.

Virtualization manager 110 may include VM migration functionality that migrates an active VM from one hypervisor to another hypervisor. In one example, virtualization manager 110 may include a virtual machine migration component 112 and a hypervisor database 114. The virtual machine migration component 112 may extract certain information, such as identification information (e.g., hypervisor name, hypervisor IP address, etc.), a set of configuration parameters (e.g., software packages, network settings, security settings, power management settings, etc.), and the like, and store the information in the hypervisor database 114 for each existing hypervisor 122A, 122B and/or 122C. Further, the virtual machine migration component 112 may store received operating states from the VDSM of the host systems 120A, 122B and/or 120C for the hypervisors 122A, 122B and 122C in the hypervisor database 114.

The virtual machine migration component 112 may receive requests to install a new VHC (e.g., VHC 126B) on VM 124 and identify a network the VHC is to operate on. The virtual machine migration component 112 may determine that hypervisor 122A does not support the network the new VHC is to operate on by searching the hypervisor database 114 to identify the networks supported by hypervisor 122A. The virtual machine migration component 112 may then identify other hypervisors (e.g., hypervisors 122B and/or 122C) that support that network by searching the hypervisor database 114. Although host systems 120A, 120B and 120C are each shown executing a single hypervisor 122A, 122B and 122C respectively, in some implementations host systems 120A, 120B and 120C may execute multiple hypervisors. Furthermore, although host systems 120A, 120B and 120C are shown, it should be understood that any number of host systems may be included in a data center. According to some aspects of the present disclosure, as described below, the virtual machine migration component 112 may determine if the other hypervisors support existing VHCs (e.g., VHC 126A) on the VM 124 by searching the hypervisor database 114 and identifying a network the existing VHC's are to operate on. The virtual machine migration component 112 may then search the hypervisor database 114 and identify the networks the other hypervisors support to determine if the other hypervisors support the existing VHCs of VM 124. According to other aspects of the present disclosure, the virtual machine migration component 112 may determine if the host systems providing the other hypervisors have an amount of computing resources, such as memory or processing capability, available to operate the virtual machine 124 by searching the hypervisor database 114 for the available computing resources of a corresponding host system.

Upon determining that the other hypervisors support the network VHC 126B is to operate on, the virtual machine migration component 112 may migrate virtual machine 124 to one of the other hypervisors. In the event that there are multiple hypervisors available to migrate virtual machine 124 to, the virtual machine migration component 112 may determine which hypervisor to migrate virtual machine 124 to in view of a migration policy stored in hypervisor database 114, as will be discussed in more detail below.

Figure 2:
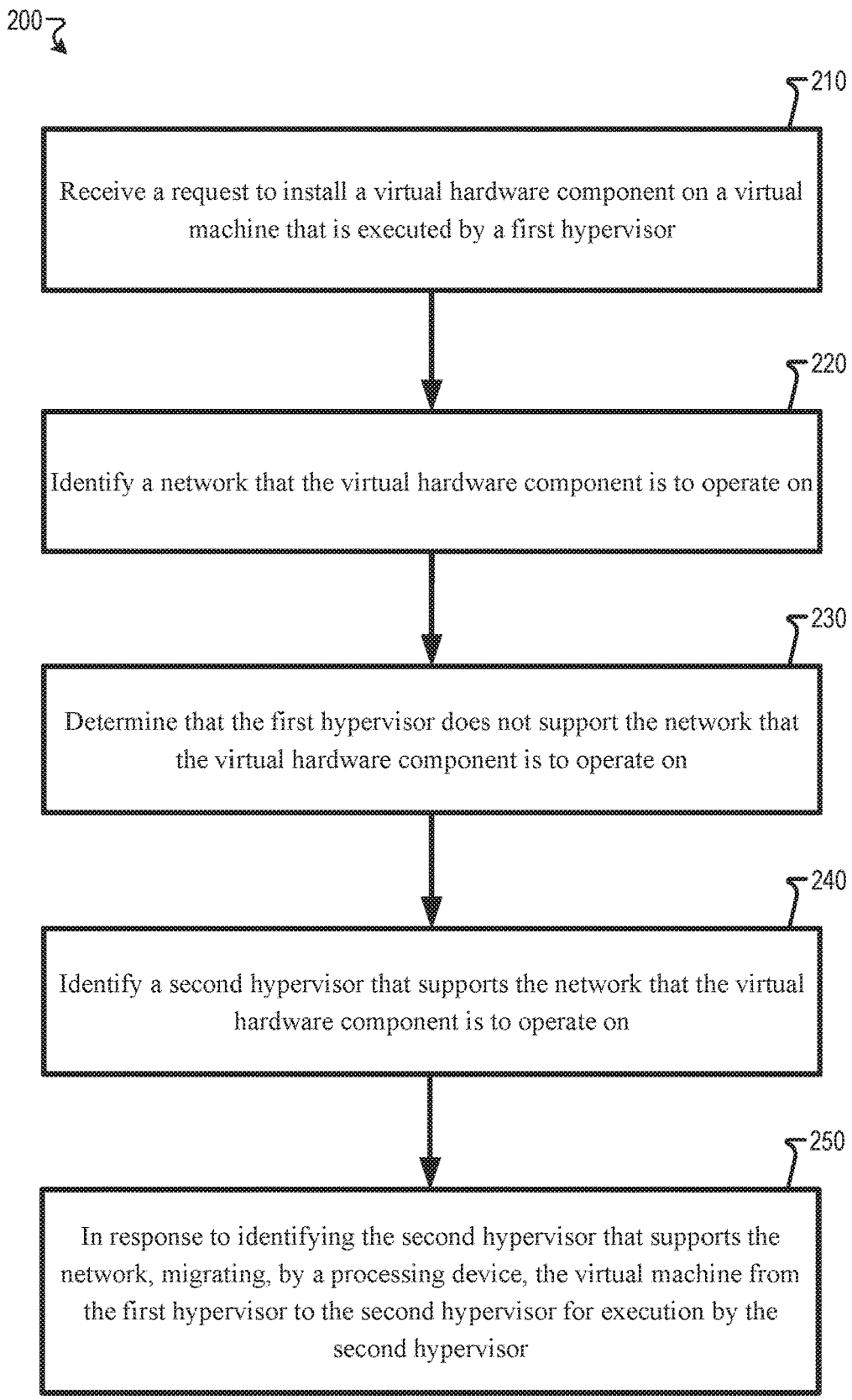
FIG. 2 depicts a flow diagram of an example method to migrate a virtual machine from one hypervisor to another hypervisor in accordance with one or more aspects of the present disclosure.

FIG. 2 depicts a flow diagram of an example method 200 to migrate a virtual machine from one hypervisor to another hypervisor. The method 200 may be performed by a processing device that may include hardware (e.g., processing logic, circuitry, dedicated logic, programmable logic, microcode, etc.), software (e.g., instructions run or executed on a processing device), or a combination thereof. In general, the method 200 may be performed by the virtual machine migration component 112 of FIG. 1.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

Method 200 may begin with a processing device receiving a request to install a new virtual hardware component on a virtual machine that is executed by a first hypervisor (block 210). The request may include requirements for the operation of the new VHC. The requirements may identify the networks that the VHC is to operate on, computing resources required to provide the VHC, and the like.

The processing device may further identify a network that the VHC is to operate. For example, based on the received installation request, the processing device may identify that the VHC is to operate on network A. At block 230, the processing device may determine that the first hypervisor does not support the network VHC is to operate on. The processing device may query the hypervisor database to retrieve the networks supported by the first hypervisor to see if the supported networks correlate to the network VHC is to operate on. For example, when the processing device queries the database it may identify that the first hypervisor supports network B, but does not support network A. Therefore, the processing device may determine that the first hypervisor does not support the network. A hypervisor may be considered to not support a particular network when the hypervisor has not been configured to receive and transmit data over the particular network.

Furthermore, the processing device may identify a second hypervisor (e.g., hypervisor 122B and/or 122C) that supports the network that the VHC is to operate on (block 240). The processing device may query the hypervisor database to retrieve hypervisors that support the network VHC is to operate on. For example, the processing device may query the hypervisor database to identify hypervisors (e.g., hypervisors 122B and/or 122C) that support network A. Additionally, in response to identifying the second hypervisor that supports the network, the processing device may migrate the VM from the first hypervisor to the second hypervisor for execution by the second hypervisor (block 250). For example, upon the processing device identifying that the second hypervisor supports the network that the VHC is to operate on, the processing device may migrate the virtual machine from the first hypervisor that is currently providing or executing the virtual machine to the second hypervisor so that the virtual machine may no longer be executed by the first hypervisor and instead may be executed by the second hypervisor. In one implementation, the processing device may migrate an active virtual machine to the other hypervisor without interrupting the operation of the virtual machine. In some implementations, the VM may be migrated to a hypervisor executed by another host system (e.g., 120B or 120C). In other implementations, however, a host system may execute multiple hypervisors and the VM may be migrated to another hypervisor executed by the same host system that provides the first hypervisor currently executing the virtual machine. In some implementations, after the VM is migrated the virtualization manager may facilitate installation of the VHC on the VM.

Figure 3:
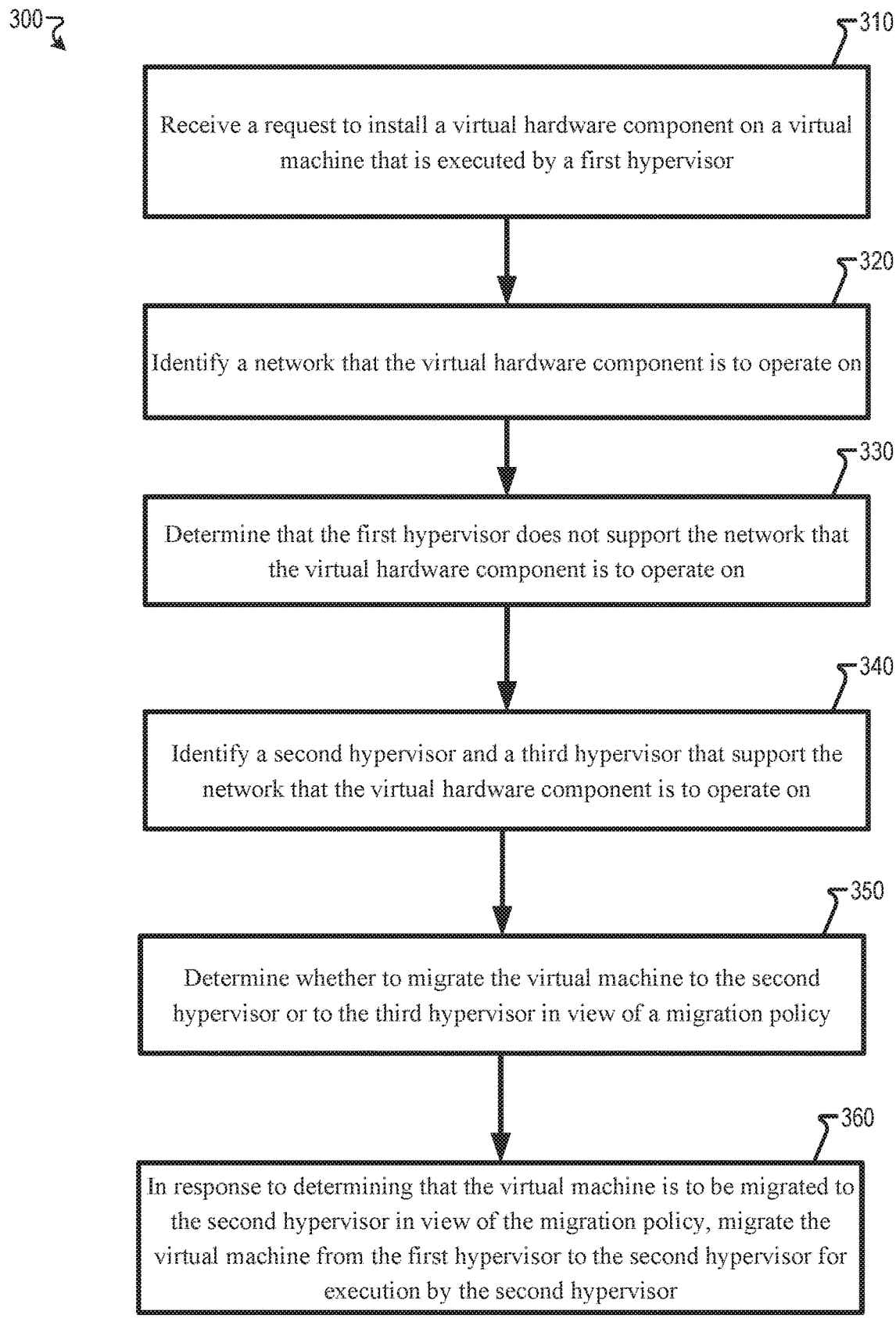
FIG. 3 depicts a flow diagram of an example method to migrate a virtual machine from one hypervisor to another hypervisor in view of a migration policy in accordance with one or more aspects of the present disclosure.

FIG. 3 depicts a flow diagram of an example method 300 to migrate a virtual machine from one hypervisor to another hypervisor in view of a migration policy. The method 300 may be performed by a processing device that may include hardware (e.g., processing logic, circuitry, dedicated logic, programmable logic, microcode, etc.), software (e.g., instructions run or executed on a processing device), or a combination thereof. In general, the method 200 may be performed by the virtual machine migration component 112 of FIG. 1.

Method 300 may begin with a processing device receiving a request to install a new VHC on a virtual machine that is executed by a first hypervisor (block 310). The new VHC may be a virtual network interface card (vNIC) that is to be used by the virtual machine. The request may include requirements for the operation of the new VHC. For example, the requirements may specify a particular network that the vNIC is to operate on (e.g., to receive data and transmit data on the network), computing resources required to provide the vNIC, and the like.

The processing device may identify a network that the VHC is to operate on (block 320). For example, based on the received installation request, the processing device may identify that the VHC is to operate on network A. The processing device may further determine that the first hypervisor does not support the network that the VHC is to operate on (block 330). The processing device may query a hypervisor database to retrieve the networks supported by the first hypervisor to determine if the supported networks match with the network that the VHC is to operate on. For example, when the processing device queries the database it may identify that the first hypervisor supports network B, but does not support network A. Therefore, the processing device may determine that the first hypervisor does not support the network that is to be used to operate the VHC that is to be installed on the virtual machine.

The processing device may identify a second hypervisor and a third hypervisor that support the network that the VHC is to operate on (block 340). The processing device may query the hypervisor database to identify hypervisors that support the network that the VHC is to operate on. For example, the processing device may query the hypervisor database and identify that each of the second hypervisor and the third hypervisor support network A. At block 350, the processing device may determine whether to migrate the virtual machine to the second hypervisor or to the third hypervisor in view of a migration policy (block 350). The processing device may identify the migration policy stored in a hypervisor database.

In one implementation, the processing device may identify a migration policy that instructs the processing device to evenly distribute VMs in view of each host systems' computing (CPU) load. For example, if a first host system has a higher CPU load than a second system, then the processing device may migrate the VM to a hypervisor that is executed by the second host system. In another implementation, the migration policy may instruct the processing device to evenly distribute VMs in view of the number of VMs operating on each hypervisor. For example, if the second hypervisor is running two VMs and the third hypervisor is running one VM, then the processing device may migrate the VM to the third hypervisor. In a further implementation, the migration policy may be a power saving policy where VMs are migrated to host systems with a higher utilization of computing resources. For example, if a first host system is using more computing resources than a second host system, then the processing device may migrate the VM to a hypervisor executed by the first host system. In yet another implementation, the migration policy may be a cluster upgrade policy where VMs are migrated from a hypervisor using an older version of an OS to a hypervisor using a new version of the OS, allowing the hypervisor using the older version of the OS to be upgraded to the new version. For example, if the first and second hypervisors are using an older version of an OS and the third hypervisor is using the new version of the OS, then the processing device may migrate the VM to the third hypervisor.

Furthermore, in response to determining that the VM is to be migrated to the second hypervisor in view of the migration policy, the processing device may migrate the VM from the first hypervisor to the second hypervisor for execution by the second hypervisor (block 360).

Figure 4:
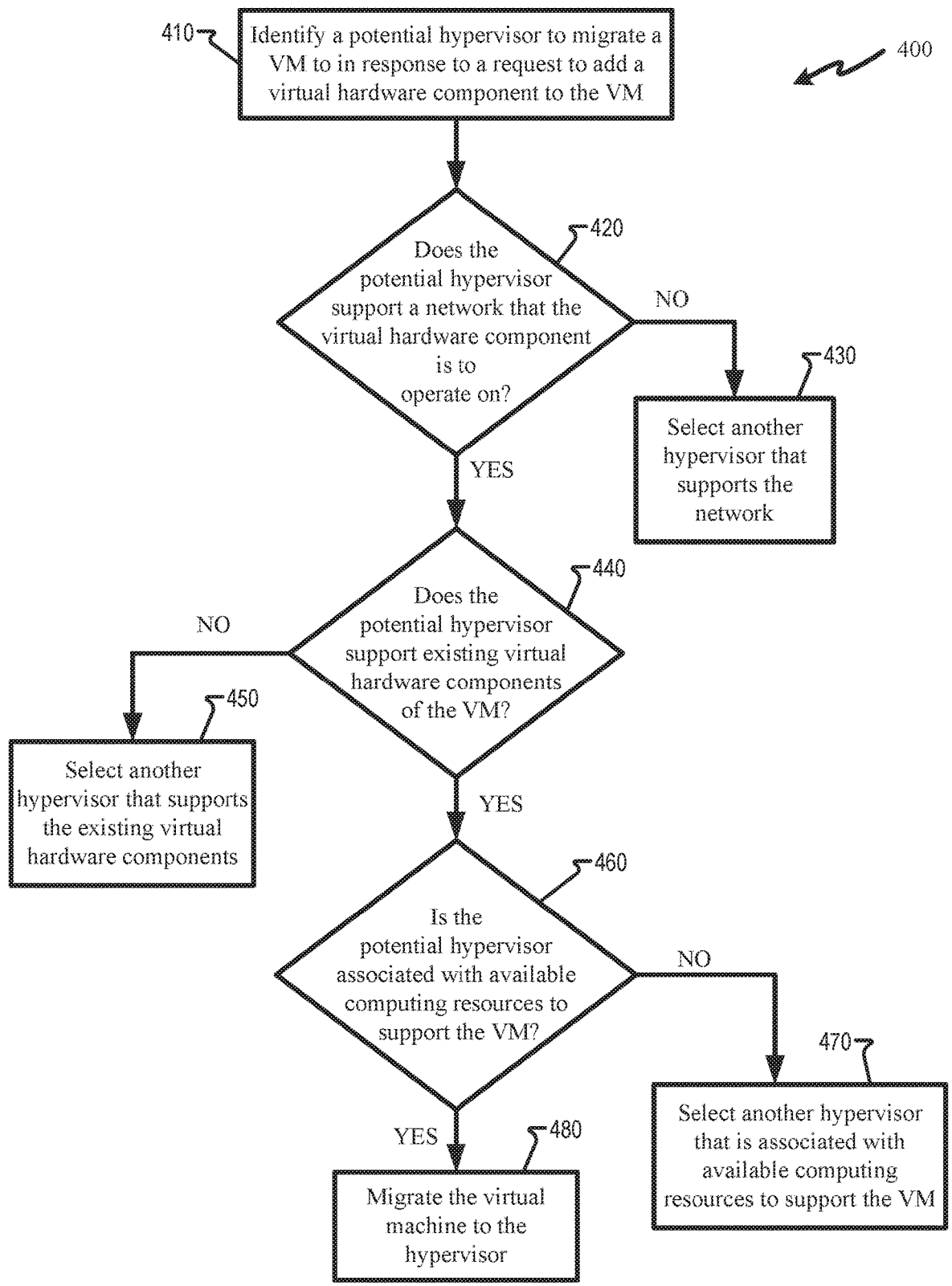
FIG. 4 depicts a flow diagram of an example method to determine whether a hypervisor supports a virtual machine that is to be migrated in accordance with one or more aspects of the present disclosure.

FIG. 4 depicts a flow diagram of an example method 400 to determine whether a hypervisor supports a virtual machine that is to be migrated. The method 400 may be performed by a processing device that may include hardware (e.g., processing logic, circuitry, dedicated logic, programmable logic, microcode, etc.), software (e.g., instructions run or executed on a processing device), or a combination thereof. In general, the method 400 may be performed by the virtual machine migration component 112 of FIG. 1.

Method 400 may begin with a processing device identifying a potential hypervisor to migrate a VM to in response to a request to add a virtual hardware component to the VM (block 410). For example, the potential hypervisor may be identified when a virtual network interface card (vNIC) is requested to be added to a VM that is currently being executed or provided by another hypervisor that does not support a network that is to be used by the vNIC. The processing device may further determine whether the potential hypervisor supports the network that the virtual hardware component is to operate on (block 420). For example, a determination may be made as to whether the potential hypervisor is configured to receive and transmit data over the network. Thus, the potential hypervisor may be considered to support the network when the hypervisor has been configured to communicate over the network. If the potential hypervisor does not support the network, then the processing device may select another hypervisor that supports the network (block 430). Thus, a determination may be made to not migrate the VM to the potential hypervisor. Otherwise, if the potential hypervisor supports the network, then the processing device may determine whether the potential hypervisor supports existing virtual hardware components of the VM (block 440). The existing VHCs of the VM may include, but are not limited to, other vNICs, types and amount of virtual memory, types and a number of virtual processors, and other such virtual hardware components that are currently used by the VM and supported by the current hypervisor executing the VM. The potential hypervisor may support the existing virtual hardware components when a VM executed by the potential hypervisor is configured to allow the existing virtual hardware components to be installed on a VM when it is executed by the potential hypervisor.

If the potential hypervisor does not support the existing virtual hardware components of the VM, then the processing logic may subsequently select another hypervisor that supports the existing virtual hardware components (block 450). Otherwise, if the potential hypervisor does support the existing virtual hardware components of the VM, then the processing logic may determine whether the potential hypervisor is associated with available computing resources to support the VM (block 460). The available computing resources may be the computing resources that are available at a host system that provides the potential hypervisor and that are available to be used to provide another virtual machine. If the potential hypervisor is not associated with available computing resources to support the VM, then the processing logic may select another hypervisor that is associated with available computing resources to support the VM (block 470). For example, another hypervisor at a host system that has available computing resources to provide the VM may be selected. Otherwise, if the potential hypervisor is associated with the available computing resources, then the processing logic may migrate the VM to the potential hypervisor (block 480). For example, an active virtual machine may be migrated to the potential hypervisor without interrupting the operation of the virtual machine.

Figure 5:
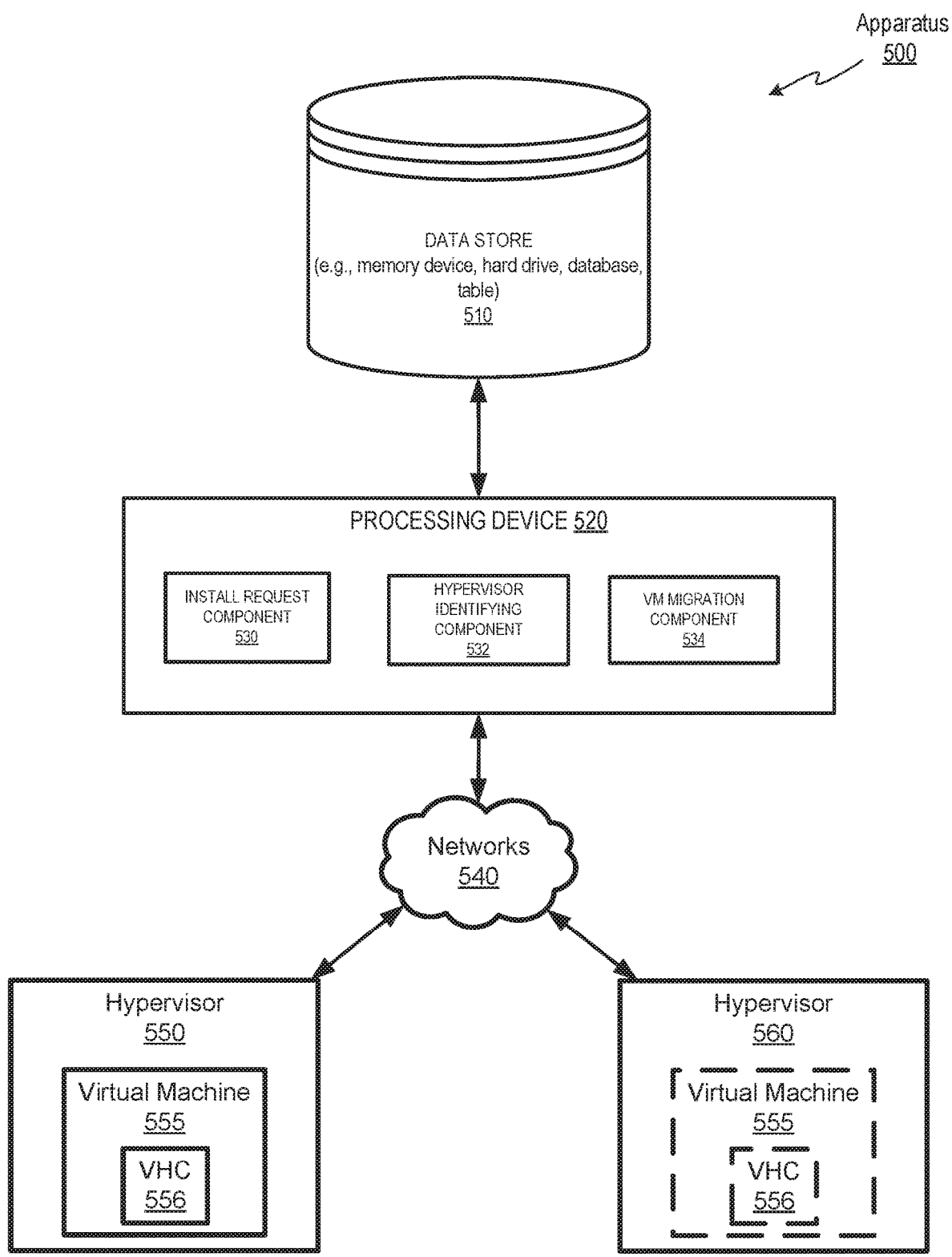
FIG. 5 illustrates an example apparatus in which implementations of the disclosure may operate in accordance with one or more aspects of the present disclosure.

FIG. 5 illustrates an example apparatus 500 in which implementations of the disclosure may operate. The apparatus 500 may be the same or similar to one of the distributed computing system, a network, or other computing devices. The data store 510 may include any non-persistent data storage (e.g., memory), persistent data storage (e.g., flash storage, hard drive, tape), another medium, or combination thereof that is capable of storing instructions for carrying out the operations of the components and module discussed herein. Furthermore, the data store 510 may store information (e.g., migration policy information).

The apparatus 500 may include a processing device 520. The processing device 520 may include an install request component 530, a hypervisor identifying component 532, and a VM migration component 534.

The install request component 530 may receive a request to install a VHC on a VM being executed by a hypervisor. The install request component 530 may also identify operating requirements of the VHC. The hypervisor identifying component 532 may identify hypervisors that support the VHC in view of the received requirements for the VHC from the install request component 530. The hypervisor identifying component 532 may also identify hypervisors in view of a migration policy, as previously discussed. The VM migration component 534 may migrate a VM from one hypervisor to another. The VM migration component 534 may also facilitate the installation of the added VHC on the VM being executed by the new hypervisor.

Figure 6:
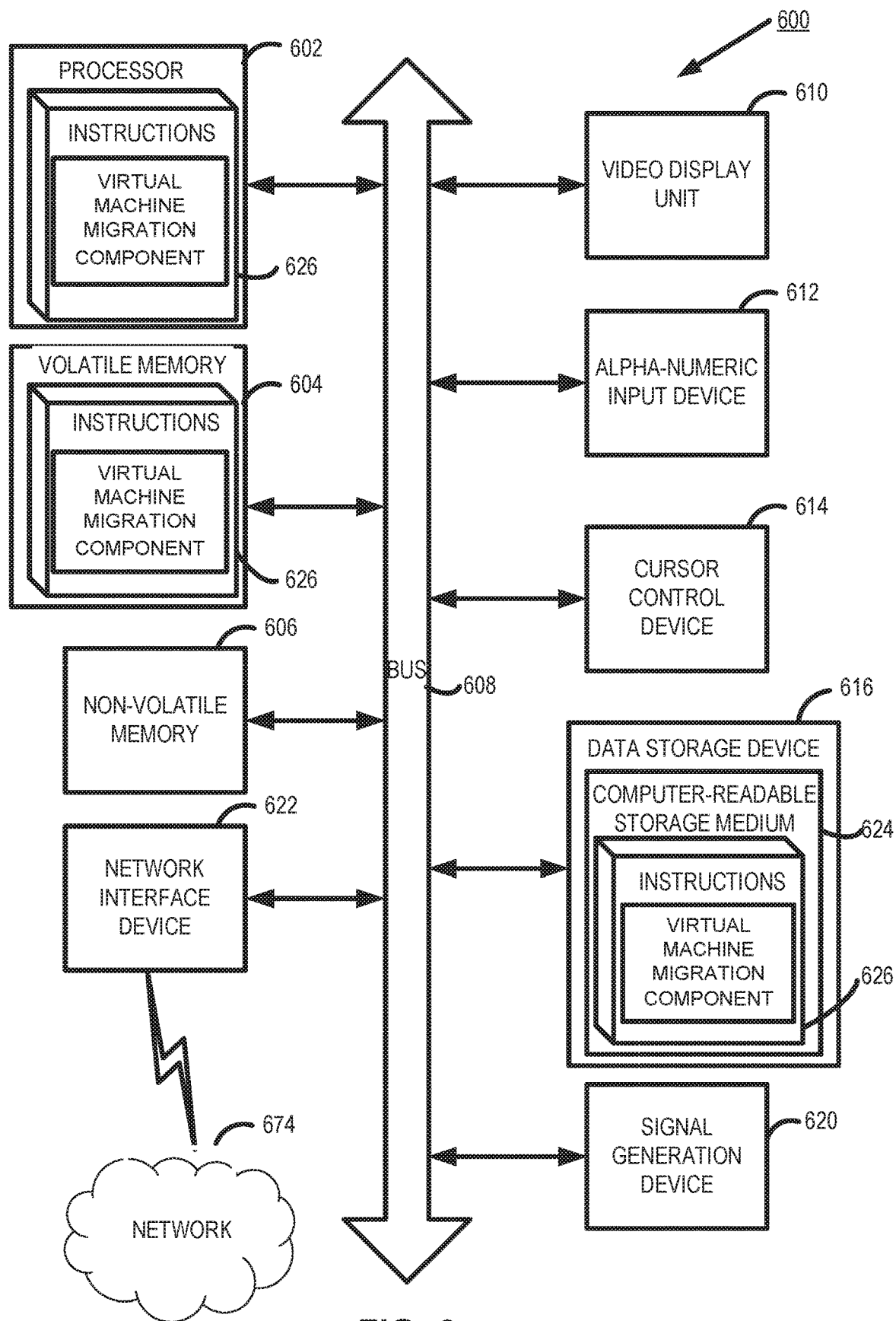
FIG. 6 depicts a block diagram of a computing system operating in accordance with one or more aspects of the present disclosure.

FIG. 6 depicts a block diagram of a computer system operating in accordance with one or more aspects of the present disclosure. In various illustrative examples, computer system 600 may correspond to a computing device within system architecture 100 of FIG. 1. The computer system 600 may host the virtualization manager 110. The computer system 600 may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a host system to translate these requests to the underlying physical computing hardware resources. This type of virtualization results in multiple VMs sharing physical resources.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processing device 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processing device 602 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alphanumeric input device 612 (e.g., a keyboard), a cursor control device 614 (e.g., a mouse), and a signal generation device 620.

Data storage device 616 may include a non-transitory computer-readable storage medium 624 on which may store instructions 626 encoding any one or more of the methods or functions described herein, including instructions encoding virtual machine migration component 112 of FIG. 1 for implementing methods 200, 300, or 400.

Instructions 626 may also reside, completely or partially, within volatile memory 604 and/or within processing device 602 during execution thereof by computer system 600, hence, volatile memory 604 and processing device 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "associating," "deleting," "initiating," "marking," "generating," "recovering," "completing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 200, 300, 400, and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving a request to install a virtual hardware component on a virtual machine;
   identifying a network that the virtual hardware component is configured to operate on;

determining whether a first hypervisor supports or does not support the network that the virtual hardware component is configured to operate on; and in response to determining that the first hypervisor does not support the network that the virtual hardware component is configured to operate on, selecting, by a processing device, a second hypervisor to migrate the virtual machine to the second hypervisor, wherein the second hypervisor supports the network.

2. The method of claim 1, wherein the first hypervisor is determined to support the network when the first hypervisor is configured to receive and transmit data over the network, and wherein the first hypervisor is determined to not support the network when the first hypervisor is not configured to receive and transmit data over the network.

3. The method of claim 1, further comprising:

determining whether the second hypervisor has computing resources available to operate the virtual machine, wherein the providing of the virtual machine to the second hypervisor is in view of determining that the second hypervisor has the computing resources available to operate the virtual machine.

4. The method of claim 1, wherein the virtual hardware component corresponds to a virtual network interface component to be used by the virtual machine to receive and transmit data over the network.

5. The method of claim 1, further comprising:

determining a resource load associated with the second hypervisor, wherein the providing of the virtual machine with the virtual hardware component to the second hypervisor is in view of the determined resource load associated with the second hypervisor.

6. The method of claim 1, wherein providing the virtual machine with the virtual hardware component to the second hypervisor corresponds to a migrating of the virtual machine and an installation of the virtual hardware component on the migrated virtual machine.

7. The method of claim 1, wherein the virtual machine is being executed by the first hypervisor.

8. A system comprising:

a memory; and a processing device, operatively coupled with the memory, to:

receive a request to install a virtual hardware component on a virtual machine;

identify a network that the virtual hardware component is configured to operate on;

determine whether a first host system supports or does not support the network that the virtual hardware component is configured to operate on; and in response to determining that the first host system does not support the network that the virtual hardware component is configured to operate on, select a second host system to migrate the virtual machine to the second host system, wherein the second host system supports the network.

9. The system of claim 8, wherein the first host system is determined to support the network when the first host system is configured to receive and transmit data over the network, and wherein the first host system is determined to not support the network when the first host system is not configured to receive and transmit data over the network.

10. The system of claim 8, wherein the processing device is further to:

determine whether the second host system has computing resources available to operate the virtual machine, wherein the providing of the virtual machine to the second host system is in view of determining that the second host system has the computing resources available to operate the virtual machine.

11. The system of claim 8, wherein the virtual hardware component corresponds to a virtual network interface component to be used by the virtual machine to receive and transmit data over the network.

12. The system of claim 8, wherein the processing device is further to:

determine a resource load associated with the second host system, wherein the providing of the virtual machine with the virtual hardware component to the second host system is in view of the determined resource load associated with the second host system.

13. The system of claim 8, wherein providing the virtual machine with the virtual hardware component to the second host system corresponds to a migrating of the virtual machine and an installation of the virtual hardware component on the migrated virtual machine.

14. The system of claim 8, wherein the virtual machine is being executed by the first host system.

15. A non-transitory computer readable medium comprising instructions, which when executed by a processing device, cause the processing device to:

receive a request to install a virtual hardware component on a virtual machine;

identify a network that the virtual hardware component is configured to operate on;

determine whether a first hypervisor supports or does not support the network that the virtual hardware component is configured to operate on; and in response to determining that the first hypervisor does not support the network that the virtual hardware component is configured to operate on, select, by the processing device, a second hypervisor to migrate the virtual machine to the second hypervisor, wherein the second hypervisor supports the network.

16. The non-transitory computer readable medium of claim 15, wherein the first hypervisor is determined to support the network when the first hypervisor is configured to receive and transmit data over the network, and wherein the first hypervisor is determined to not support the network when the first hypervisor is not configured to receive and transmit data over the network.

17. The non-transitory computer readable medium of claim 15, wherein the processing device is further to:

determine whether the second hypervisor has computing resources available to operate the virtual machine, wherein the providing of the virtual machine to the second hypervisor is in view of determining that the second hypervisor has the computing resources available to operate the virtual machine.

18. The non-transitory computer readable medium of claim 15, wherein the virtual hardware component corresponds to a virtual network interface component to be used by the virtual machine to receive and transmit data over the network.

19. The non-transitory computer readable medium of claim 15, wherein the processing device is further to:

determine a resource load associated with the second hypervisor, wherein the providing of the virtual machine with the virtual hardware component to the second hypervisor is in view of the determined resource load associated with the second hypervisor.

20. The non-transitory computer readable medium of claim 15, wherein providing the virtual machine with the virtual hardware component to the second hypervisor corresponds to a migrating of the virtual machine and an installation of the virtual hardware component on the migrated virtual machine.

\* \* \* \* \*